ELECTRICAL INFORMATION SYSTEM

Filed Aug. 2, 1952 6 Sheets-Sheet 1

INVENTORS K. S. DUNLAP
C. A. LOVELL
BY
ATTORNEY

ELECTRICAL INFORMATION SYSTEM

INVENTORS K. S. DUNLAP
C. A. LOVELL
BY
A. Guenther
ATTORNEY

ELECTRICAL INFORMATION SYSTEM

Filed Aug. 2, 1952 6 Sheets-Sheet 3

INVENTORS K. S. DUNLAP
C. A. LOVELL
BY [signature]
ATTORNEY

Aug. 16, 1955 K. S. DUNLAP ET AL 2,715,658

ELECTRICAL INFORMATION SYSTEM

Filed Aug. 2, 1952 6 Sheets-Sheet 4

INVENTORS K. S. DUNLAP
C. A. LOVELL
BY [signature]
ATTORNEY

INVENTORS K. S. DUNLAP
C. A. LOVELL
BY [signature]
ATTORNEY

Aug. 16, 1955 K. S. DUNLAP ET AL 2,715,658

ELECTRICAL INFORMATION SYSTEM

Filed Aug. 2, 1952 6 Sheets-Sheet 6

INVENTORS K. S. DUNLAP
C. A. LOVELL

BY [signature]

ATTORNEY

United States Patent Office 2,715,658
Patented Aug. 16, 1955

2,715,658

ELECTRICAL INFORMATION SYSTEM

Kermit S. Dunlap, Madison, and Clarence A. Lovell, Summit, N. J., assignors to Bell Telephone Laboratories, Incorporated, New York, N. Y., a corporation of New York Application August 2, 1952, Serial No. 302,372

26 Claims. (Cl. 179—27)

This invention relates to systems for determining the condition of a plurality of lines or terminals at a point removed from a control station and, more particularly, to such a system for determining the condition of a plurality of subscriber lines emanating from a satellite office in a telephone system and connected to a remote central office by a smaller number of trunks.

In the application Serial No. 302,371, filed August 2, 1952, of K. S. Dunlap and C. A. Lovell, there is described a telephone system in which a large number of subscriber lines are connected to a central office through a satellite office and a smaller number of trunks extending between the office, whereby considerable savings in the telephone plant, and particularly in the copper required for the subscriber loops, are effected. In such a telephone system, a number of satellite switches and a switch controller are advantageously incorporated in the satellite office to effect the desired connections between the trunks and the subscriber lines. As the subscriber lines themselves thus do not enter the central office, it is necessary that some means be provided in the satellite office for transmitting to the central office information as to the condition at any time of any of the satellite lines. Specifically, the information that is desired designates in which of three conditions a particular subscriber line is: idle, requesting new service, or busy. A line is idle when the telephone instrument which it connects to the satellite office is not in use for any reason. A line is requesting new service when a telephone receiver has been removed from its cradle, and the subscriber is waiting a connection to the operator in the central office to place a call, if the central office is a manual office. A line is busy when it is connected by a satellite switch to one of the trunks extending to the central office, as when a call has been placed.

In the telephone system described in the above-mentioned application, it is also necessary that there be in the central office equipment which can receive and register the information as to the condition of the subscriber line transmitted to it from the satellite office. This central office equipment also has to be able to identify the particular subscriber line to which the information received is pertinent.

While this invention will be described with reference to telephone systems, and more particularly with reference to a telephone system of the type described in the above-mentioned application, it is to be understood that it is not to be considered as limited to telephone applications alone, as our novel system is equally readily applicable to other systems where a number of electrical lines are connected to some central station by a smaller number of lines, and it is important at that central station to receive at any time some information concerning the condition of the remote electrical lines. Such other applications may be in the field of computers, telegraph communication systems, data transmission systems, or other systems where information is present at a remote point on a plurality of conductors. This information may be in the form of voltage present or absent at a number of terminals, current flow in a number of conductors, or in other forms.

It is a general object of this invention to enable ascertainment at some central station of the condition of any of a number of lines remote from the central station and not individually connected thereto.

More specifically, objects of this invention are to scan a number of remote lines, to relay information as to the condition of those lines as determined by the scanning thereof, to receive that information at a central station, to register that information, and to identify at the central station the line that the information is pertinent to.

Further, it is an object of this invention to improve telephone systems employing satellite stations for switching and connecting any of a number of telephone subscriber lines to a smaller number of trunks extending from the satellite office to the central office.

In one specific illustrative embodiment of this invention, which may be incorporated in the telephone system described in the above-identified application, the line information scanner located in the satellite office comprises a plurality of indicating coils, each of which may advantageously be wound on a core of magnetic material mounted in a rim of non-magnetic material. Each of these coils is associated with one of the telephone subscriber lines, and the coils are mounted in an orderly array in succession in accordance with the code assigned to the telephone instruments; thus, if a hundred subscriber lines extend from the central office, the coils are mounted in order around the rim from code 00 through to code 99. A rotating arm having a scanning coil positioned at its end is swept past the indicating coils so that, if current flows in an indicating coil and sets up a magnetic field adjacent that coil, a pulse is generated in the scanning coil. A stationary start coil is positioned within the rim and a permanent magnet is advantageously, in this specific embodiment of this invention, located on the rotating arm so that a start pulse is generated once each sweep of the scanning coil past the indicating coils. Advantageously, the start coil is located so that a start pulse is generated as the scanning coil is sweeping between the indicating coil for the code telephone 99 and the indicating coil for the code telephone 00. Means are then provided, in accordance with this invention, as described further below, for passing a current through the coil if the subscriber line is in a condition other than idle.

As the start coil generates a pulse once each sweep, each subscriber line can be considered as having a time slot in the period between successive start pulses. By looking at that time slot, by appropriate equipment in the central office in accordance with this invention, as described further below, the condition of that particular line may be ascertained. In accordance with this invention, the presence of no pulse in that time slot indicates that the line is idle, while the presence of a pulse of one polarity indicates that the line is busy, and the presence of a pulse of opposite polarity indicates that the line is requesting new service. Thus, in this specific illustrative embodiment of the invention, means are provided for creating a magnetic field of one polarity adjacent the indicating coil for one condition and creating a magnetic field of opposite polarity for another condition. More specifically, in this illustrative embodiment of the invention, each indicating coil comprises a double winding, the first winding of which is connected to a voltage source and to ground through the telephone instrument, and is used for determining when the subscriber is requesting new service, and the second winding is connected to a voltage source through the satellite switch and the central office and to ground through the telephone instrument for determining when the subscriber line is busy.

Further, in this specific illustrative embodiment of the invention, the central office line information receiving equipment includes a counter, an oscillator for driving the counter, a circuit for starting the oscillator on reception of a start pulse, a "look" circuit which opens a gate circuit in the middle of each subscriber's time slot, and the gate circuit itself which turns off the counter if a new service request pulse is present in a particular subscriber's time slot. The number of pulses counted by the counter in the interim between the reception of the start pulse by the apparatus and the turning off of the counter because of the presence of a new service request pulse can then be read on a code basis on an indicator, thereby identifying the subscriber line requesting new service. In this specific embodiment, if a busy test is to be made, the code number of the line to be looked at is set up in a translator; the counter is then operated on reception of a start pulse. If there is a busy pulse present in the time slot assigned to that code number, the look pulse circuit recognizes it, and a busy indication is registered on appropriate apparatus, as by lighting a lamp.

It is, therefore, one feature of this invention that each of a plurality of remote lines be assigned a time slot in a cycle determined by the generation of a start pulse and that any of three possible conditions of those lines be identified by the absence of any pulse in the time slot, the presence of a negative pulse in the time slot, or the presence of a positive pulse in the time slot.

Further, it is a feature of this invention that each of the remote lines have associated therewith an indicating coil, that all of the indicating coils be mounted in an array, and that a scanning coil be swept past the indicating coils in succession, means being provided for generating a magnetic field of one polarity in an indicating coil if one condition is present on the associated line, thereby generating a pulse of one polarity in the scanning coil, and means being provided for generating a magnetic field of the reverse polarity on the presence of another condition on the associated line, thereby generating a pulse of the reverse polarity in the scanning coil. Further, in accordance with this feature of the invention, a start coil is provided for generating a start pulse once each sweep of the scanning coil past the arrayed indicating coils for identifying the time slots of each of the indicating coils. And more particularly, in accordance with this feature of the invention, each of the indicating coils advantageously comprises two windings, means being present for passing current through one of the windings, depending on the condition of the associated line.

It is a further feature of this invention that apparatus be provided at the central station to receive the line information pulses from the remote lines, the apparatus comprising a counter, means for starting the counter on reception of a start pulse, means for looking at the time slot of the remote lines to identify the presence of a pulse of either polarity, and means for indicating the condition of the line in response to the presence of a pulse in the time slot of either polarity.

Further, it is a feature of this invention that the counter be driven by an oscillator at a rate such that the time between successive driving pulses from the oscillator to the counter is equal to the time between successive time slots and that means be provided for looking at the time slot of each subscriber line as the corresponding code for that line is counted by the counter.

These and other desirable features of this invention may be readily understood from consideration of the following detailed description and the accompanying drawing, in which:

Fig. 1 is a block diagram representation of a telephone system as described in application Serial No. 302,371, filed August 2, 1952, of K. S. Dunlap and C. A. Lovell, in which this invention may be advantageously utilized;

Figure 1:
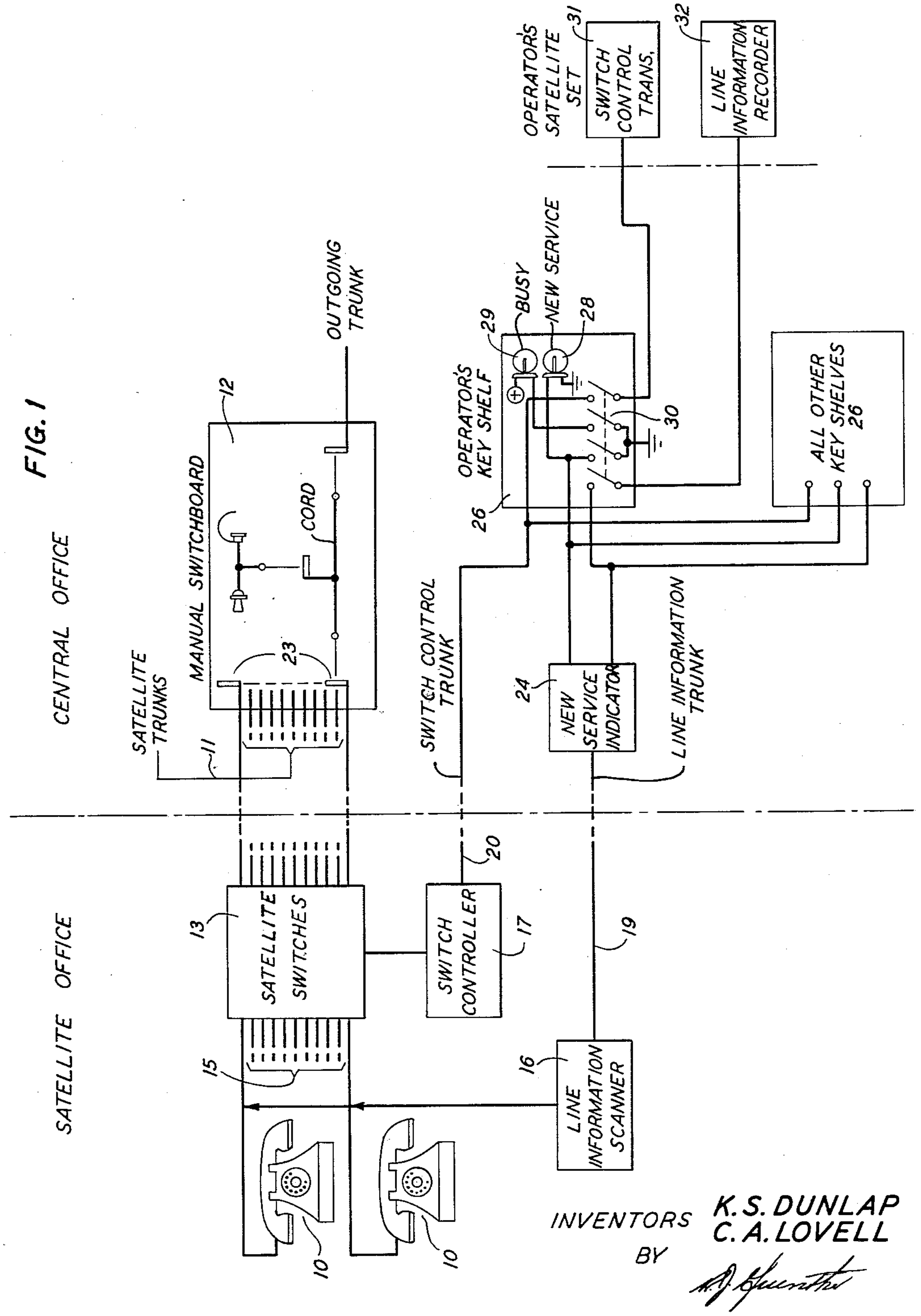

Turning now to the drawing, Fig. 1 is a block diagram representation of one specific telephone system with which this invention may be employed, though it is to be understood that this invention is not to be considered as limited either to this particular telephone system or to employment in combination with telephone systems. This telephone system is described in detail in the application Serial No. 302,371, filed August 2, 1952, of K. S. Dunlap and C. A. Lovell, to which application reference is made for a complete description thereof. Basically, the system comprises a plurality, such as a hundred, of subscriber instruments 10 connected by a number of satellite trunks 11 such as ten, to a central office switchboard 12 through a satellite office. The satellite office comprises switching apparatus 13 associated with each of the trunks 11, whereby a trunk may be connected to any of the subscriber lines 15, a line information scanner 16, which advantageously is in accordance with this invention, and a switch controller 17. The line information scanner is connected to the line information receiving equipment in the central office, in accordance with this invention, by a number of call wires in a line information trunk 19, the line information receiving equipment being shown in Fig. 1 as a new service indicator 24 and a line information recorder 32. The switch controller 17 is likewise connected to a switch control transmitter 31 in the central office by a switch control trunk 20, as more fully described in the above-mentioned application.

In the central office, the satellite or talking trunks 11 are terminated in multiple jacks 23 on the central office switchboard 12, which is indicated as being a manual board. An operator's key shelf 26 is also provided and comprises a new service lamp 28, a busy lamp 29, and a satellite key 30 by which connections are made to the switch control transmitter 31 and the line information recorder 32 of the operator's satellite set.

Figure 2:
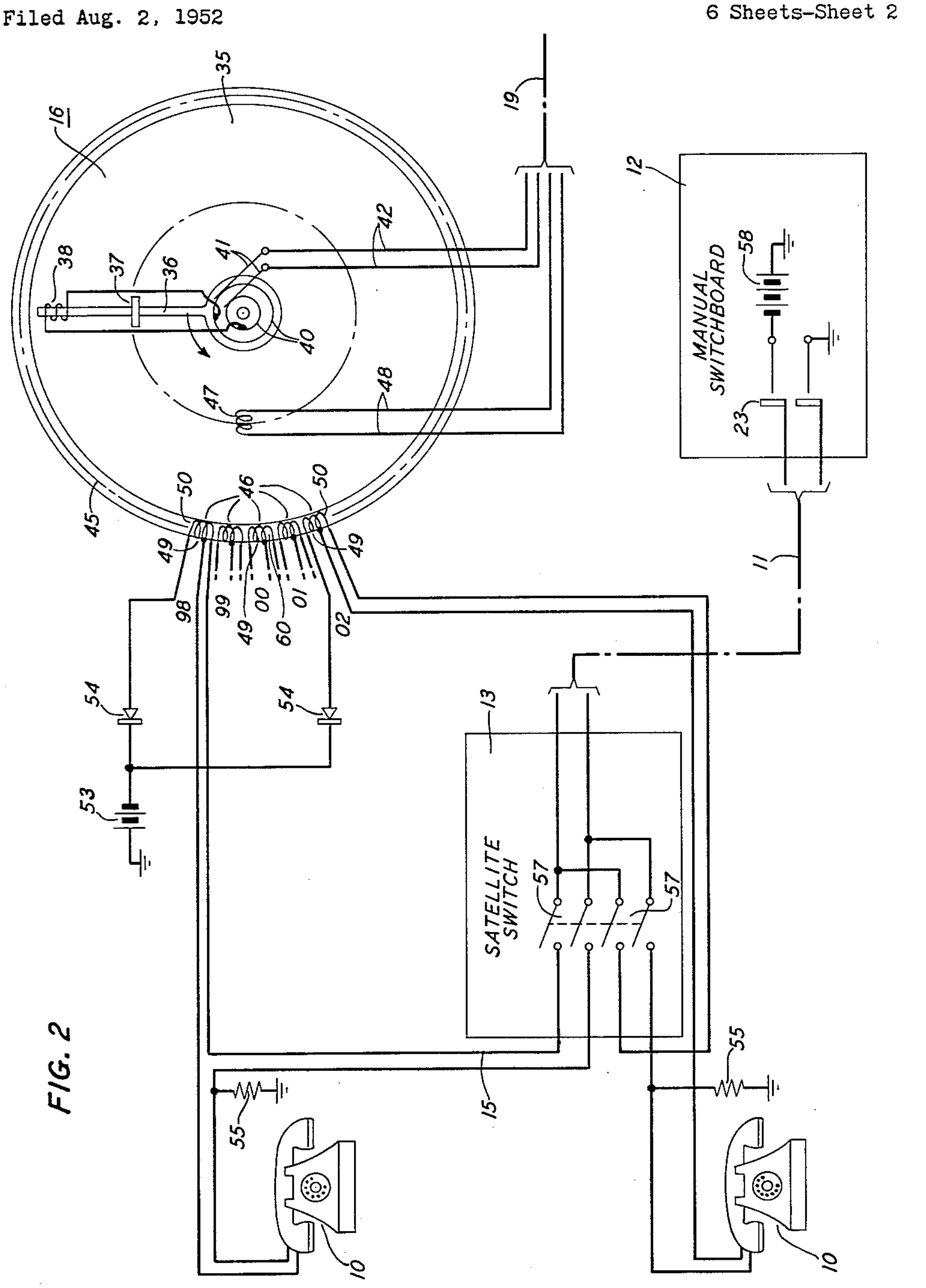
Fig. 2 is a schematic representation of one specific embodiment of a line information scanner illustrative of this invention.
Figure 3:
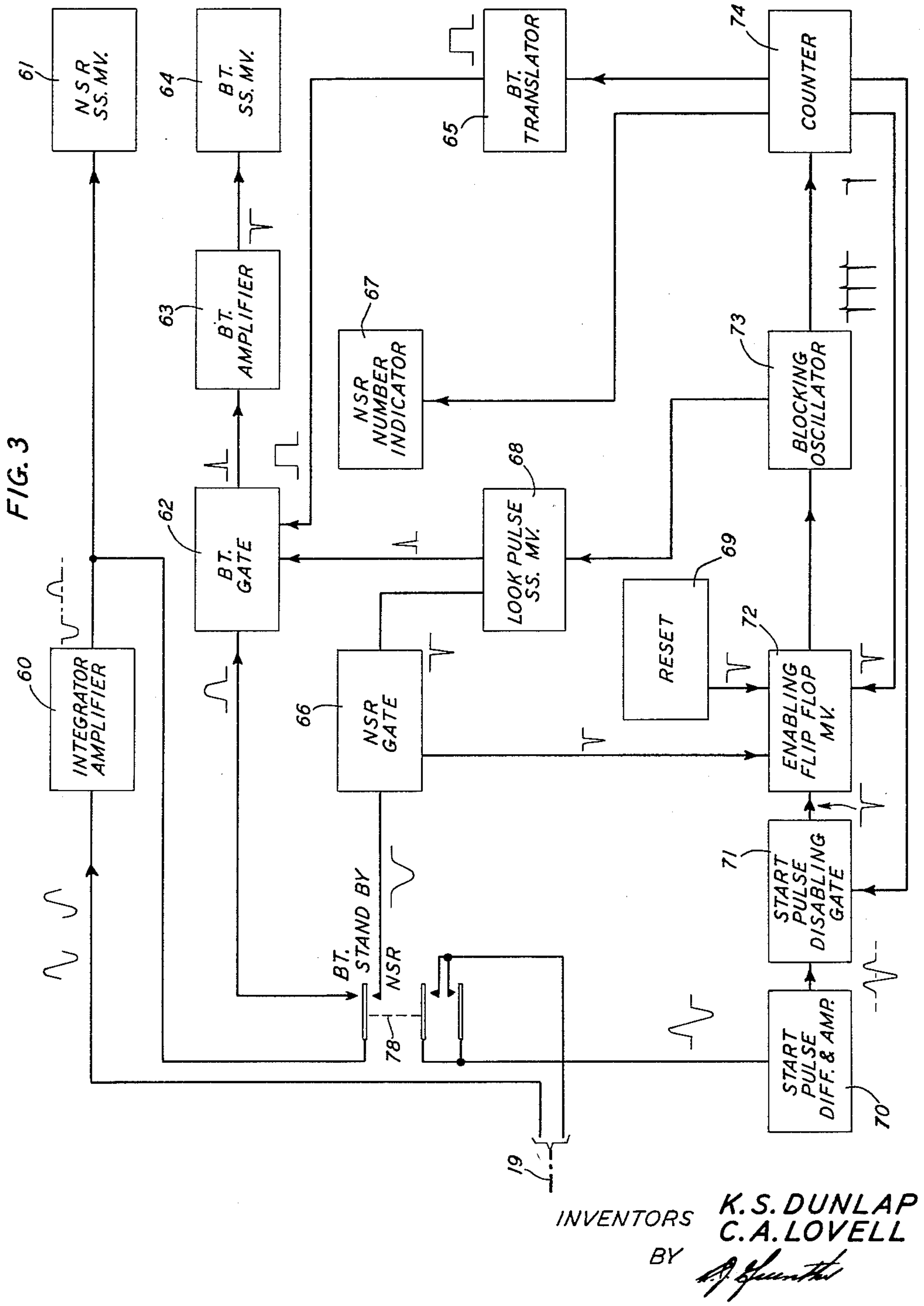
Fig. 3 is a block diagram of one specific embodiment of a line information receiving and registering circuit in accordance with this invention.

In this specific utilization of this invention, the information desired at the central office about the remote lines is whether they are idle, busy, or requesting new service. Referring now to Fig. 2, there is there shown one specific embodiment of this invention for utilization in a telephone system. As there seen, the line information scanner 16 may advantageously comprise, in accordance with this invention, an electromagnetic rotary scanner 35 having a rotating arm 36 with a permanent magnet 37 attached thereto and a scanning coil 38 located at the end thereof. The scanning coil 38 is connected by slip rings 40 and contacts 41 to two lines 42 of the line information trunk 19 and through the trunk 19 to the integrator amplifier of the new service indicator 24, shown in Fig. 3. Positioned on the rim 45 of the rotary scanner 35 are, in this specific embodiment, a hundred indicating coils 46, each connected to a separate subscriber. A start coil 47 is positioned within the scanner 35 and advantageously so as to be swept by the rotating arm 36 between the indicating coils 46 for the subscriber lines identified by the codes 99 and 00. The start coil 47 is connected, through a second pair of lines 48 of the line information trunk 19, to the start pulse differentiator and amplifier of the new service indicator 24, as shown in Fig. 3. The subscriber coils 46 are each composed of two windings, a new service request winding 49, and a busy winding 50, as explained further below.

Advantageously, the rotating arm 36 may be driven by a $\frac{1}{250}$ horsepower motor at a speed of 1800 revolutions per minute, and the start coil 47 is mounted on an adjustable bracket inside the ring of subscriber coils 46 so as to be swept by the permanent magnet 37 once during each revolution of the arm 36. In this means, a short sinusoidal wave is induced in the start coil 47 once every revolution just before the scanning coil reaches the first subscriber coil, connected to subscriber 00. This voltage, which shall be referred to subsequently as the start pulse, is used to start a cycle of operation in the information receiving equipment in the central office in synchronism with the scanner information, as further explained below.

The operation of the scanner and the circuit advantageously employed therewith can be best understood by reference to the functions performed by this specific embodiment of the invention. When a telephone subscriber, such as that represented by the code number 98 removes the receiver of his instrument 10 from its hook, a circuit is completed comprising the battery 53, which advantageously supplies a potential of 18 volts, the unidirectional current device 54, which may advantageously be a varistor or semiconductor device, the new service request winding 49, the instrument 10, and a resistance 55, which may advantageously be 1200 ohms. The current which is flowing in this circuit in flowing through the winding 49 sets up a field which induces in the scanning coil 38 a cycle of a negative sine wave. This cycle or pulse is transmitted, by the slip rings 40, contacts 41, lines 42, and trunk 19, to the new service indicator 24.

When the subscriber is busy on an incoming or outgoing call, his relay contacts 57 of the satellite switch 13 are closed, and current will flow in the circuit comprising the voltage supply 58, which may advantageously be 48 volts, the busy winding 50, and the instrument 10. The varistor 54 is rendered non-conducting because of the change of polarity across it as the voltage supply 58 is of a higher potential than the voltage supply 53. The current now flowing in the busy winding 50 of the coil 46 sets up a field which is opposite in polarity to that set up by the winding 49 for a new service request. A sinusoidal pulse of positive polarity is therefore induced in the scanning coil 38 as it sweeps past the coil 46, so that a pulse of opposite sign is transmitted by the trunk 19 to the new service indicator when the line is busy. Thus, in accordance with this invention, the same scanning and transmitting apparatus is employed to indicate whether a subscriber is requesting service or is busy, a sinusoidal pulse of one polarity being indicative of one state and a sinusoidal pulse of the opposite polarity being indicative of the other state. The polarity of a full wave pulse can be considered to be the polarity of the first half cycle.

Thus, three different pulses are transmitted from the scanner at the satellite office to the information receiving equipment at the central office. These pulses are the start pulse, which is generated by the start coil 47 and sent over one call wire of the line information trunk 19, and a busy pulse and a new service request pulse, the last two being one cycle sine waves of opposite polarity generated by one of the indicating coils 46 and sent over another call wire of the trunk 19. The information receiving equipment must identify these pulses and take appropriate action on receiving them. This action comprises identifying the subscriber requesting service or the completion of a busy test on a particular subscriber line.

Referring now to Fig. 3, there is shown a block diagram of the information receiving equipment in accordance with one specific embodiment of this invention. Certain elements of this equipment are common to both the functions of a busy test and a new service request indication. In the following table, the elements are listed, those elements being employed only in the busy test being identified as B. T., those employed only in the new service request indication as N. S. R., and those common to both functions as Com. All the equipment but the integrator amplifier and new service request single shot multivibrator is advantageously common to several satellites.

| Element | Function |
|---|---|
| Integrator Amplifier 60 | Com |
| New Service Request Single Shot Multivibrator 61 | NSR |
| Busy Test Gate 62 | BT |
| Busy Test Amplifier 63 | BT |
| Busy Test Single Shot Multivibrator 64 | BT |
| Busy Test Translator 65 | BT |
| New Service Request Gate 66 | NSR |
| New Service Number Indicator 67 | NSR |
| Look Pulse Single Shot Multivibrator 68 | Com |
| Reset 69 | Com |
| Start Pulse Differentiator and Amplifier 70 | Com |
| Start Pulse Disabling Gate 71 | NSR |
| Enabling Flip-Flop Multivibrator 72 | Com |
| Blocking Oscillator 73 | Com |
| Counter 74 | Com |

The functioning of this equipment can best be understood by a description of its operation for each of its functions. Considering the new service request function first, when a subscriber removes the receiver of his telephone 10 from its cradle, a field is set up in his subscriber coil 46 positioned on the rim of the scanner 35 which causes a one cycle sine wave pulse to be generated in the scanning coil 38 when the rotating arm 36 sweeps by the coil 46, as described above. This sinusoidal pulse, which we may assume to be negative, i. e., the first half cycle is negative and when integrated the result is a negative half cycle pulse, is transmitted over trunk 19 to the integrator amplifier 60 of the new service indicator 24 associated with that particular satellite, where it is both integrated and amplified. The output of the amplifier, which is a negative pulse indicating a new service request, trips the new service request single shot multivibrator 61 advantageously causing a neon bulb to light, thereby indicating to the operator what satellite office is requesting service.

The operator will then throw a switch 78 to the new service request position, thereby connecting the integrator amplifier 60 to an idle line information receiving circuit and also applying the start pulse from the scanner to the start pulse differentiator and amplifier 70. The differentiation and amplification of the start pulse produces a sharp negative signal which is fed through an open start pulse disabling gate 71 to the enabling flip flop multivibrator 72. Until this time the flip flop multivibrator 72 has been in a condition cutting off the blocking oscillator 73. When the negative pulse flips the enabling flip flop 72, the blocking oscillator 73 is caused to oscillate with a period between pulses equal to the time slot assigned to each satellite subscriber.

The output of the blocking oscillator has two functions; it causes a modified binary counter 74 to count each pulse from the oscillator, and it also trips the "look" pulse single shot multivibrator 68 with each pulse from the oscillator. The "look" pulse multivibrator has a natural period of one-half the period of the blocking oscillator and is used as a source of a sharp pulse placed in the center of each subscriber's time slot. A negative look pulse from the look pulse multivibrator 68 opens the new service request gate 66 for a short time in the center of each subscriber's time slot. If no signal, or if a positive signal, representing a busy line, is arriving at the new service request gate 66 from the integrator amplifier 60, there is no output from the new service request gate 66.

However, in the time-slot occupied by the subscriber requesting service, a large negative pulse will arrive at the new service request gate 66 from the integrator amplifier 60. When that pulse is present, a negative pulse is fed through the new service request gate 66 when it is open by the look pulse to the enabling flip flop 72, which flips it back to the off position. This stops the blocking oscillator 73 and the counter 74 remains in a position indicating the count of the time-slot of the subscriber requesting service, i. e. indicating the number of pulses from the oscillator 73 that have been counted, at the rate of one pulse for each time slot, since the start pulse. This count can be read, in the code employed, on the new service indicator 67, which advantageously consists of neon bulbs or the like connected to the plate circuits in the counter.

When the revolving arm 36 in the scanner 35 again passes the start coil 47, another start pulse is generated and transmitted to the central office. In order to prevent the oscillator 73 starting again and thus advancing the counter 74 by the same number as appeared on it before, a start pulse disabling gate 71 is interposed between the start pulse differentiator and amplifier 70 and the enabling flip flop multivibrator 72 and permits the start pulse to pass through it only when the counter is in its zero position. A reset circuit, which may advantageously be activated when the switch 78 is returned to its open position, enables the counter to count up to the end of its complete cycle and then turn itself off.

If the operator wishes to determine whether a particular subscriber line 15 is busy before placing a call through to it on one of the trunks 11, he first sets up the number of the line to be tested in the busy test translator 65 in the particular code of the equipment, which may advantageously be the modified binary code described in the above-mentioned application. This will cause a positive voltage to appear at the output of the translator 65 throughout the tested subscriber's time slot when the counter is running. The operator then connects the switch 78 for a busy test. This allows a positive busy pulse, which has been integrated and amplified, to be applied to the busy test gate 62 and also again applies the start pulse to the start pulse differentiator and amplifier 70. The start pulse will start the oscillator 73 and counter 74 running, as described above. For a busy test, however, no signal appears to stop the oscillator until the counter has completed its cycle, at which time it shuts off.

As noted above, a positive voltage appears at the output of the translator 65 for the particular code set up in it when the counter has reached that time slot. Further in the center of every time slot, as before, a sharp look pulse appears from the multivibrator 68. Both the positive pulse from the translator 65 and the positive pulse from the multivibrator 68 appear at the busy test gate 62. If there is any signal at the output of the integrator amplifier 60, it appear at a third input to the gate 62. This gate 62 is so designed that a positive pulse appears at its output only when all three inputs are present. This pulse from gate 62 is advantageously amplified by amplifier 63 and applied to a single shot multivibrator 64, which activates an indicator, such as a neon lamp. This lamp will appear to stay on until the code in translator 65 is changed, the busy test equipment removed by opening switch 78, or the tested subscriber line ceases to be busy.

Figures 4, 7:
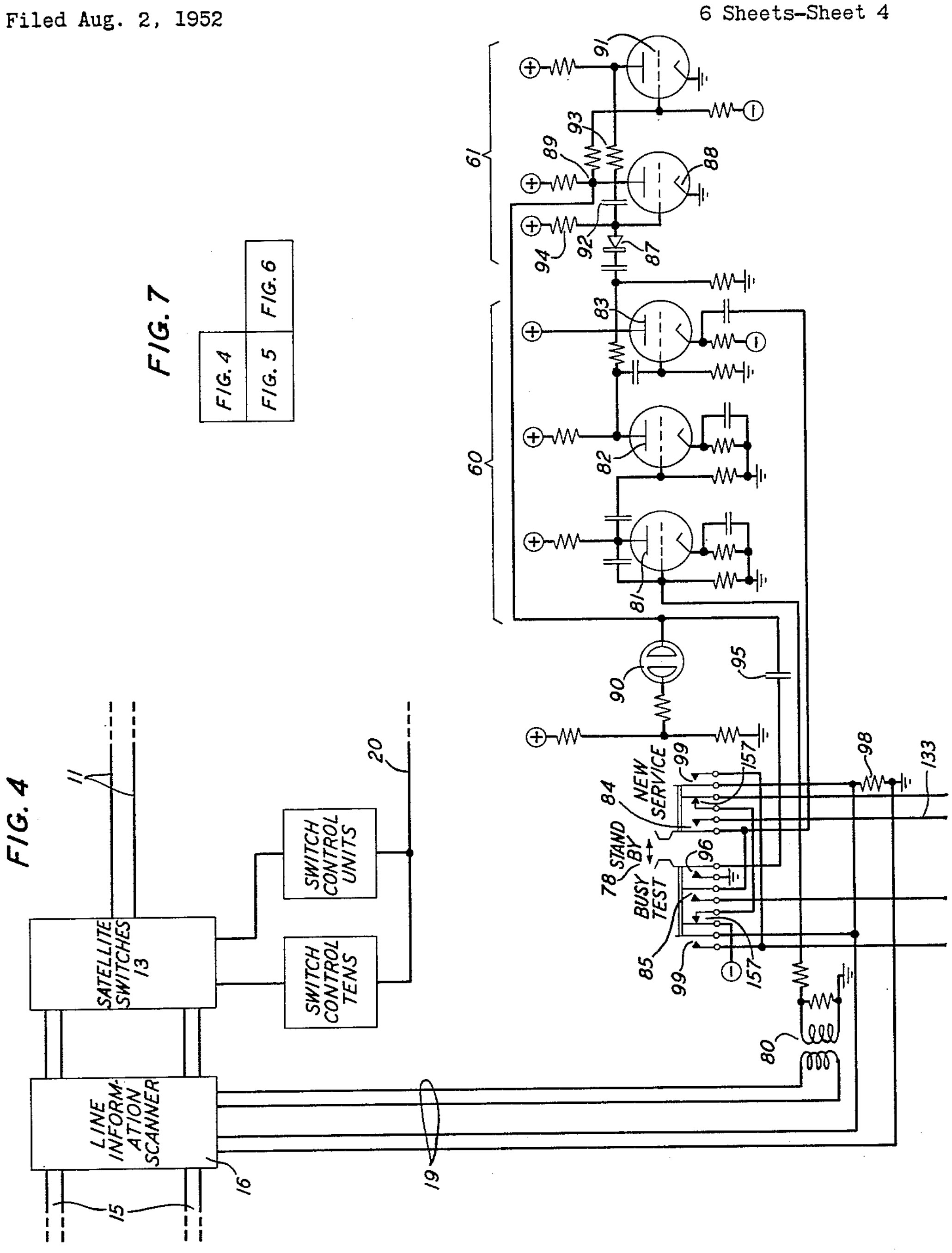
Figs. 4, 5 and 6 are schematic representations of the circuit of Fig. 3.
Fig. 7 shows how Figs. 4, 5 and 6 should be placed together.
Figure 5:
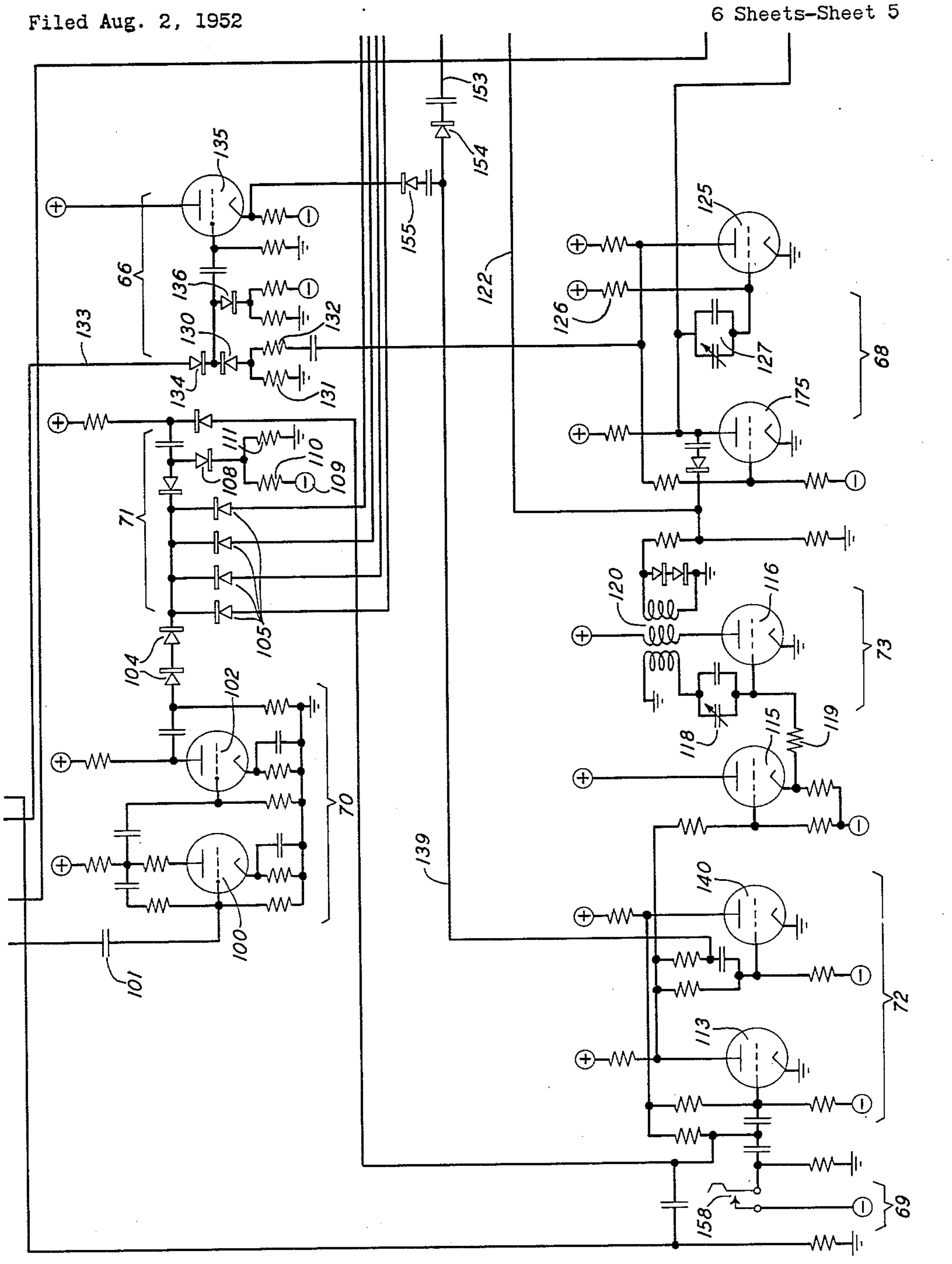
Figure 6:
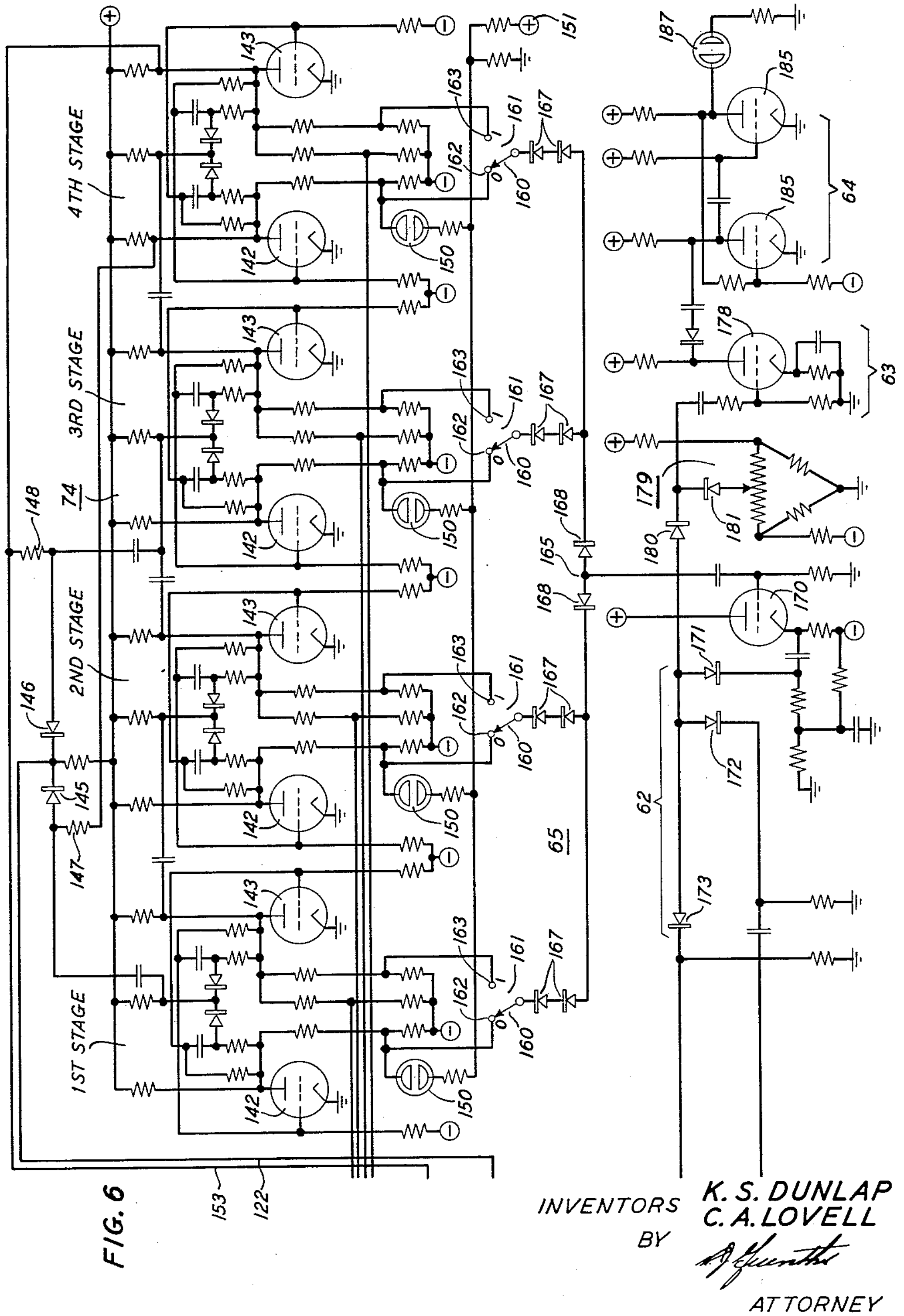

Turning now to Figs. 4, 5, and 6, the proper grouping of which is indicated in Fig. 7, there is shown a schematic representation of one particular group of circuits in accordance with this invention. The new service request and busy pulses arriving from the scanner 16 over call wires of the trunk 19 pass through a transformer 80 and are applied to the grid of a first tube 81 of the integrator amplifier 60. The output of the tube 81 is capacity coupled to the grid of a second tube 82. The output of this second tube is applied by means of the cathode follower tube 83 and contacts 84 of the switch 78 to the new service request gate 66 if the switch 78 is thrown to the new service position or to the busy test gate through contacts 85 if the switch 78 is thrown to the busy test position. The output of the tube 82 of the integrator amplifier 60 is also applied, through a unidirectional circuit element, such as a varistor 87, to the grid of the first tube 88 of the single shot multivibrator 61. The varistor 87 allows only negative pulses, indicating new service requests, to be applied to the grid of the normally conducting tube 88 thereby extinguishing the tube. This raises the potential at point 89 and thus across the indicating device 90 causing it to break down giving an indication of a new service request. The change of potential at point 89 also causes tube 91 to become conducting for a period of time depending upon the capacity 92 and resistance 93 coupling the plate of tube 91 to the grid of tube 88 and resistance 94 between the grid and a positive potential, which period is advantageously less than the scanning cycle. When the multivibrator 61 returns to its normal condition, a positive pulse is reflected back into the system. This may be objectionable if the pulse is reflected into the time slot of a subscriber about to be tested for a busy condition. Therefore, when a busy test is made, the multivibrator 61 is disabled by having the plate of tube 88 connected to ground through a large capacitor 95 and through contacts 96 on switch 78.

The start pulse is transmitted from the scanner 16 over another call wire of the trunk 19 and appears across a resistance 98 and thence, through contacts 99 on the switch 78 in either of its positions, at the grid of the tube 100 which, together with the input capacitance 101 and the feedback circuit of the tube 100 comprises the differentiator stage of the differentiator and amplifier 70. The pulse is then fed to the amplifier tube 102 comprising the amplifier stage. Having been thus amplified and shaped into a sharp pulse, the pulse is applied to the start pulse disabling gate 71 through the diode 104 which allows, in this specific embodiment, only the negative portion of the differentiated pulse to pass through. The start pulse disabling gate 71 comprises a plurality of diodes or varistors 105 each connected to an output of the counter 74 and normally at a negative potential so that if there is no output on any of the counter leads, the varistors 105 appear to the negative pulse as merely a high impedance. When one or more of the counter outputs has a positive potential present on it, the diode 105 of that counter output is biased so as to appear as a low impedance to the positive potential and the negative pulse does not pass through the gate 71. An additional diode or varistor 108 acts as a gate or clamping circuit to compare the differentiated start pulse to a voltage determined by the voltage source 109 and resistances 110 and 111 to permit only pulses more negative than a certain voltage, such as —20 volts, to pass through to the enabling flip flop multivibrator 72.

The pulse passed by the gate 71 is applied to the grid of tube 113 of the multivibrator 72. Tube 113 is normally conducting but is extinguished when the pulse is applied to its grid. This causes its plate potential to be increased thereby increasing the potential applied to the grid of a cathode follower tube 115 allowing it to conduct and to bring the grid of the oscillator tube 116 of the oscillator 73 into its conducting range. The period of oscillation of the oscillator is chosen to be equal to the period between time slots in the scanning apparatus, the period being determined by choosing proper values for the variable capacitance 118 and the resistance 119. The pulse output of the blocking oscillator is fed through the transformer 120 over a lead 122 to the counter 74, further described below, and also to the grid of the normally conducting tube 125 of the look pulse multivibrator 68, thereby extinguishing that tube. When tube 125 again becomes conducting on operation of the multivibrator circuit a negative pulse is applied to the new service request gate 66, arriving at the mid point of the subscriber's time slot. The period of extinction of the tube 125 is determined by the resistance 126 and the variable capacitance 127 and is advantageously half that of the period of oscillation.

The negative pulse from the look pulse multivibrator 68 is applied to the new service request gate 66 which comprises a diode or varistor 130 and resistances 131 and 132. The gate 66 allows a new service request negative pulse from the integrator amplifier 60, which pulse is transmitted by the contacts 84 of switch 78 and lead 133, to be applied to a diode or varistor 134 of the gate 66. When a new service request pulse is present on varistor 134 coincident with the presence of a look pulse at varistor 130, a pulse is applied to the cathode follower tube 135 if that resultant pulse is more negative than the clamping voltage at the clamping varistor 136. A sharper pulse is then delivered from the cathode follower tube 135 over a lead 139 to the conducting tube 140 of the enabling multivibrator 72 to render that tube non-conducting and thus return the multivibrator to its idle codition. When the multivibrator is returned to its idle condition the blocking oscillator is cut off so that no more pulses are delivered to the counter circuit and thus the number then registered by the counter is the number of the subscriber line which initiated the new service request pulse.

The counter 74, as shown in this schematic representation, is arranged to count on a base or cycle of ten. It is to be understood that the choice of counter and counting cycle will be dependent upon the code employed to identify the lines being scanned and also the number of lines it is desired to scan and that the counter cycle may be any integer. In the specific telephone system described in the above-mentioned Dunlap-Lovell application with which this information system may advantageously be employed a hundred subscriber lines extend from each satellite station. Two such counters as shown in the drawings would therefore be employed for binary counting on a decimal base, the first counter corresponding to a units digit counter and the second counter a tens digit counter, and the output of the last stage of the first counter being applied to the input of the first stage of the second counter, as is known in the counter art. In such a case it is to be understood that the references in the following description to the circuit means for stopping the enabling multivibrator would refer to the last stage of the tens counter. However, as any integer may be used as the counting base, the base corresponding to the number of lines being scanned, each counter section of the counter circuit may not have the same number of stages, but the circuit means to the enabling multivibrator will be energized by the last stage of the counter, regardless of the counting base. Also it is to be understood that the number of varistors 105 in the start pulse disabling gate will be dependent on the base of the counter and on the number of output terminals in the counter, there being one varistor 105 and connecting lead for each output terminal in the counter.

In the specific circuit illustrated in the drawing the counter 74 comprises only four stages arranged for modified binary counting on a decimal base. While only ten lines can be identified by these four stages, additional stages or counters can be added by those skilled in the art, as pointed out above, so that the counter can count up to the total number of lines being examined. In this embodiment each stage of the counter includes a pair of triodes 142 and 143, tube 143 being normally conducting and tube 142 being normally non-conducting.

The oscillator pulses are applied to a steering circuit sometimes referred to as an electronic switch, comprising the two diodes 145 and 146 controlled by the last stage of the counter. During the first eight pulses from the oscillator the last stage is in its normal condition so that the positive voltage is applied to the resistance 147 connected to diode 145 and a voltage is applied to resistance 148 connected to diode 146 more negative than that applied to resistance 147 whereby the pulses are applied to the input of the first stage of the counter. The number of pulses applied to the counter is read by indicating devices, such as neon bulbs 150, connected between the plate of the tubes 142 and a positive voltage source 151 so that the bulbs 150 of the new service request number indicator 67 are lit when the tube 142 associated therewith is conducting. After the first eight pulses the steering circuit directs the ninth and tenth pulses to the third stage of the counter. The counter thus counts in a modified binary code, as described in the above-mentioned application. A fuller description of the counter and of the modified binary code employed therewith is contained in the application Serial No. 263,598, filed December 27, 1951 by E. T. Burton.

When the tenth pulse is received all stages of the counter are returned to their idle position and a negative pulse is applied by the fourth stage over lead 153 to the lead 139 to turn off the enabling flip flop multivibrator 72. A diode 154 is inserted in lead 153 before its connection to lead 139 and a similar diode 155 is connected to the cathode of the cathode follower 135 to prevent pulses from the cathode follower 135 being applied to the last stage of the counter. The diodes 154 and 155 thus comprise a negative "or" circuit, a negative pulse either from the cathode follower 135 or from the last stage of the counter applying a negative pulse to the lead 139 to turn off the multivibrator 72. After a code has been counted by the counter, the counter may be returned to its idle condition by opening switch 78 which closes normally closed contacts 157 applying a negative pulse to the multivibrator 72 to allow it to turn the oscillator on and thus permit the counter to count up to its normal condition. The counter may also be reset without opening switch 78 by closing a reset switch 158, which similarly applies a negative voltage to the multivibrator 73 to turn the oscillator on.

For a busy test the operator will first set the arm 160 of each switch 161 associated with a counter stage to a contact 162 or 163, the contacts 162 being the "0" contacts and being normally positive and the contacts 163 being the "1" contacts and being normally negative. Thus if the number "1" is to be set up in the busy test translator the arm 160 of the switch associated with the first stage is set to the contact 163 so that, on reception of one pulse, a positive output pulse is received when the tube 143 becomes extinguished. The counter, it should be remembered, is not turned off during the busy test until it has counted one complete cycle, i. e., the number of pulses equal to the number of lines being examined, but then a new start pulse is received to start the cycle again.

The output terminal of the translator, represented by the point 165, will become positive only when each one of the four switches 161 has a positive signal applied to it; thus point 165 will only become positive when the code set up in the translator is counted by the counter. The diodes 167 connected to the switches 161 and the diodes 168 between the diodes 167 and the point 165 comprise a positive "and" circuit which produces an output only on the occurrence of four conditions, namely positive voltage appearing at the four output stages of the counter.

By this translator a positive signal is generated only at the time of the time slot of the subscriber's line that it is desired to test and this positive pulse is applied to the cathode follower tube 170 and through the cathode follower tube 170 to a first diode 171 of the busy test gate 62, the gate comprising also the diodes 172 and 173. An output is attained from the busy test gate 62 only if a positive pulse is simultaneously present on the call wire from the satellite station in the subscriber's time slot and then only at the center of this time slot as determined by the positive pulse from the look pulse multivibrator 68. The positive pulse from the integrator amplifier 60, indicating a pulse in the time slot of the subscriber, is applied to the diode 173 through the contacts 85 of the switch 78 and the look pulse is applied to the diode 172 from the plate of the tube 175 of the look pulse multivibrator.

A positive signal is taken from the gate 62 and applied to the grid of an amplifier tube 178 provided that it is greater than the positive voltage applied to a clamping circuit 179 comprising the diodes 180 and 181 and resistances 172.

The amplifier tube 178 both amplifies the pulse and reverses its sign so that a negative pulse is applied to the single slot multivibrator 64, comprising two triodes 185. When the multivibrator is turned on an indicating device, such as neon lamp 187 is lit, indicating that the particular subscriber line being tested is busy.

While the terms "diode" and "varistor" have been employed in the above description of this specific circuit employable in this invention, it is to be understood that either device may be employed and that further all such devices may also advantageously comprise any suitable rectifier, vacuum tube, gaseous discharge device, or other suitable device.

It is to be understood that the above-described arrangements are but illustrative of the application of the principles of this invention. Numerous other arrangements may be devised by those skilled in the art without departing from the spirit and scope of the invention.

What is claimed is:

1. In an electrical system comprising a central station and a plurality of lines remote from that station, means for relaying to said station information as to the condition of said lines, said means comprising a plurality of indicating coils arranged in an array, one of said coils being associated with each of said lines, means for passing a current through said coils to generate a magnetic field of one polarity on the occurrence of one condition on one of said lines, means for passing a current through said coils to generate a magnetic field of the opposite polarity on the occurrence of another condition on said one line, a scanning coil, means for sweeping said scanning coil past said array of indicating coils to generate a pulse in said scanning coil if a field is present at one of said indicating coils, a start coil, means to generate a start pulse in said start coil once every sweep of said scanning coil past said array of indicating coils, and means to transmit said pulses to said central station, and means within said central station for recognizing and identifying said indicating pulses transmitted thereto, said last-mentioned means comprising means comprising a counter for identifying said line, an oscillator for driving said counter, means for turning on said oscillator on reception of a start pulse at said central station, means for recognizing the coincidence of an indicating pulse and a pulse from said oscillator, and means activated by said last-mentioned means for indicating the presence of a pulse generating condition on said one line.

2. In an electrical system comprising a central station and a plurality of lines remote from that station, means for relaying to said station information as to the condition of said lines, said means comprising a plurality of indicating coils arranged in an array, one of said coils being associated with each of said lines, means for passing current through said coils to generate a magnetic field of one polarity on the occurrence of one condition on one of said lines, means for passing a current through said coils to generate a magnetic field of the opposite polarity on the occurrence of another condition on said one line, a scanning coil, means for sweeping said scanning coil past said array of indicating coils to generate an indicating pulse in said scanning coil if a field is present at one of said indicating coils, the polarity of said indicating pulse being dependent on the polarity of said magnetic field, a start coil, means to generate a start pulse in said start coil once every sweep of said scanning coil past said array of indicating coils, and means to transmit said pulses to said central station, and means within said central station for recognizing and identifying said indicating pulses, said last-mentioned means comprising a counter, an oscillator for driving said counter, means for starting said oscillator on the reception of a start pulse at said central station, means for stopping said oscillator on the coincidence of an indicating pulse of one polarity and a pulse from said oscillator at said stopping means, means for indicating the number of pulses counted by said counter when said oscillator is stopped to identify said one line whose condition is represented by said indicating pulse of said one polarity, means for setting up in said counter an identification of said one line whose condition is represented by an indicating pulse of the opposite polarity, and means for indicating the coincidence of an indicating pulse of said opposite polarity and a pulse from said counter when said counter has counted up to the identification set up therein.

3. In a telephone system comprising a plurality of subscriber lines, a satellite office, and a central office, means for scanning each of said lines in succession and for generating a first signal pulse on the occurrence of a busy condition on any of said lines and a second distinct signal pulse on the occurrence of a new service request condition on any of said lines, a trunk between said offices, means for transmitting said first and second pulses to said central office over said trunk, means in said central office responsive to said first and second distinct pulses for indicating the condition of said line, and means in said central office for identifying said lines having busy and new service request conditions thereon.

4. In an electrical system comprising a central station and a plurality of lines remote from that station, means for relaying to said station information as to the condition of said lines, said means comprising, means for scanning each of said lines in succession, means for generating a first indicating pulse of one polarity on the occurrence of one condition on one of said lines, means for generating a second indicating pulse of the opposite polarity on the occurrence of another condition on one of said lines, and means for transmitting said indicating pulses to said central station, means in said central station responsive to said first and second pulses for indicating which of said conditions is occurring on said one line, and means in said central office for identifying said one line.

5. In an electrical system comprising a central station and a plurality of lines remote from that station, means for relaying to said station information as to the condition of said lines, said means comprising means for scanning each of said lines in succession at an even rate, means for generating an indicating pulse of one polarity on the occurrence of one condition on one of said lines, means for generating an indicating pulse of the opposite polarity on the occurrence of another condition on one of said lines, and means for transmitting said indicating pulses to said central station, a counter in said central station, means for driving said counter at a counting rate equal to the time between scanning of successive lines, means responsive to the coincidence of an indicating pulse and the output of said counter for identifying the line with which said pulse is associated, and means responsive to the polarity of said pulse for identifying the condition on said line.

6. In an electrical system comprising a central station and a plurality of lines remote from that station, means for relaying to said station information as to the condition of said lines, said means comprising a plurality of indicating coils arranged in an array, one of said coils being associated with each of said lines, means for passing current through said coils to generate a magnetic field of one polarity when one condition is present on one of said lines, means for passing a current through said coils to generate a magnetic field of reverse polarity when another condition is present on one of said lines, a scanning coil, means for sweeping said scanning coil past said array of indicating coils to generate a pulse in said scanning coil if a field is present at one of said indicating coils, the polarity of said generated pulse being dependent on the polarity of the magnetic field of said one coil, means to transmit said generated pulse to said central office, and means in said central office responsive to said pulse for indicating the condition of said one line.

7. In an electrical system comprising a central station and a plurality of lines remote from that station, means for relaying to said station information as to the condition of said lines said means comprising a plurality of indicating coils arranged in an array, one of said coils being associated with each of said lines and each of said coils comprising two windings, means for passing a current through one of said windings to generate a magnetic field of one polarity when one condition is present on one of said lines, means for passing current through the other of said windings when another condition is present on one of said lines, a scanning coil, means for sweeping said scanning coil past said array of indicating coils to generate a pulse in said scanning coil if a field is present at one of said indicating coils, and means to transmit said pulse to said central station.

8. In an electrical system comprising a central station and a plurality of lines remote from that station, means for relaying to said station information as to the condition of said lines, said means comprising a plurality of indicating coils arranged in an array, one of said coils being associated with each of said lines, means for passing current through said coils to generate a magnetic field of one polarity when one condition is present on one of said lines, means for passing a current through said coils to generate a magnetic field of reverse polarity when another condition is present on one of said lines, a scanning coil, means for sweeping said scanning coil past said array of indicating coils to generate a pulse in said scanning coil if a field is present at one of said indicating coils, means to transmit said pulse to said central office, a start coil, means to generate a start pulse in said start coil once every sweep of said scanning coil past said array indicating coils, means to transmit said start pulse to said central station, means in said central station responsive to said pulses generated by said one line, and means in said central office actuated by said start pulse for identifying said one line.

9. In a telephone system a plurality of subscriber telephones, a satellite office, a subscriber line connecting each of said telephones to said satellite office, a central office remote from said satellite office, at least one trunk extending between said offices, switching means within said satellite office for connecting any of said subscriber lines to said trunk, means for transmitting to said central office information indicating the condition of said subscriber lines, said means comprising a plurality of indicating coils arranged in succession, one of said coils being associated with each of said telephones, means for passing current through said coils to generate a magnetic field of one polarity when an associated telephone is being used by a subscriber but the subscriber line of said associated telephone is not connected by said switching means to said trunk, means for passing current through said coils to generate a magnetic field of the opposite polarity when an associated telephone is being used by a subscriber and the subscriber line of said associated telephone is connected by said switching means to said trunk, a scanning coil, means for sweeping said scanning coil past said succession of indicating coils to generate a pulse in said scanning coil if a field is present at one of said indicating coils, and means to transmit said pulse to said central office, and means in said central office for recognizing the polarity of said transmitted pulse to determine whether the subscriber line associated with the indicating coil that generated said transmitted pulse is connected by said switching means to said trunk.

10. In a telephone system, a plurality of subscriber telephones, a satellite office, a subscriber line connecting each of said telephones to said satellite office, a central office remote from said satellite office, at least one trunk connecting said offices, switching means for connecting any of said subscriber lines to said trunk, means for transmitting to said central office information indicating the condition of said subscriber lines, said means comprising a plurality of indicating coils mounted in an array, one of said coils being associated with each of said telephones, means for passing current through said coils to generate a magnetic field of one polarity when an associated telephone is being used but the subscriber line thereof is not connected by said switching means to said trunk, means for passing current through said coils to generate a magnetic field of the opposite polarity when an associated telephone is being used and the subscriber line thereof is connected by said switching means to said trunk, a scanning coil, means for sweeping said scanning coil past said array of indicating coils to generate an indicating pulse in said scanning coil if a field is present at one of said indicating coils, and means to transmit said pulse to said central office, a stationary start coil, means to generate a start pulse in said start coil once every sweep of said scanning coil past said array of indicating coils, means to transmit said start pulse to said central office, means in said central office for recognizing the polarity of said transmitted pulse to determine whether the particular subscriber line associated with the indicating coil that generated said transmitted pulse is connected by said switching means to said trunk, and means in said central office responsive to the reception of said start pulse for identifying said particular subscriber line.

11. In a telephone system in accordance with claim 10 means in said central office responsive to said indicating pulse to indicate the condition of the subscriber line through the associated coil of which current passed to generate said indicating pulse, and means in said central office actuated by said start pulse to identify the particular subscriber line on which that condition exists.

12. In a telephone system a plurality of subscriber telephones, a satellite office, a subscriber line connecting each of said telephones to said satellite office, a central office remote from said satellite office, at least one trunk extending between said offices, switching means for connecting any of said subscriber lines to said trunk, and means for transmitting information to said central office indicating the condition of said subscriber lines, said means comprising a plurality of indicating coils arranged in an array, each of said coils being associated with one of said telephones and comprising a pair of windings, means for passing current through one winding of said coils to generate a magnetic field of one polarity when an associated telephone is being used by a subscriber but the subscriber line thereof is not connected by said switching means to said trunk, means for passing current through the other winding of said coils to generate a magnetic field of opposite polarity when an associated telephone is being used and the subscriber line thereof is connected by said switching means to said trunk, a scanning coil, means for sweeping said scanning coil past said array of indicating coils to generate a pulse in said scanning coil if a field is present at one of said indicating coils, and means to transmit said pulse to said central office.

13. In a telephone system in accordance with claim 12 a start coil, means to generate a start pulse in said start coil once every sweep of said scanning coil past said array of indicating coils, and means to transmit said start pulse to said central office.

14. In a telephone system in accordance with claim 13 a ring member on which each of said indicating coils is mounted, a rotating arm on which said scanning coil is mounted, a permanent magnet mounted on said rotating arm and positioned to be swept past said start coil, and means for rotating said arm to sweep said scanning coil past said indicating coils.

15. In a telephone system a plurality of subscriber telephones, a satellite office, a subscriber line connecting each of said telephones to said satellite office, a central office remote from said satellite office, at least one trunk connecting said offices, switching means for connecting any of said subscriber lines to said trunk, a plurality of indicating coils arranged in an array, one of said coils being associated with each of said telephones and each of said coils comprising a pair of windings, means for passing current through one winding of said coils to generate a magnetic field of one polarity when an associated telephone is being used but the subscriber line thereof is not connected by said switching means to said trunk, said last-mentioned means comprising a first source of voltage and a unidirectional current element connected to one side of said one winding, the other side of said one winding being connected through said associated telephone to ground, means for passing current through the other winding of said coils to generate a magnetic field of opposite polarity when an associated telephone is being used and the subscriber line thereof is connected by said switching means to said trunk, said last-mentioned means comprising a second source of voltage applied to one side of said other winding through said switching means, the other side of said other winding being connected through said telephone instrument to ground, a scanning coil, means for sweeping said scanning coil past said array of indicating coils to generate a pulse in said scanning coil if a field is present at one of said indicating coils, and means to transmit said pulse to said central office.

16. In a telephone system in accordance with claim 15 wherein said two windings of said indicating coils are connected together and said second source of voltage is larger than said first source of voltage.

17. In a telephone system in accordance with claim 16 a start coil, means to generate a start pulse in said start coil once every sweep of said scanning coil past said array of indicating coils, and means to transmit said start pulse to said central office.

18. In a telephone system in accordance with claim 17 a ring member on which each of said indicating coils is mounted, a rotating arm on which said scanning coil is mounted, a permanent magnet mounted on said rotating arm and positioned to be swept past said start coil, and means for rotating said arm to sweep said scanning coil past said array of indicating coils.

19. In a telephone system, a plurality of subscriber telephones, a satellite office, a subscriber line connecting each of said telephones to said satellite office, a central office remote from said satellite office, at least one trunk extending between said offices, switching means within said satellite office for connecting any of said subscriber lines to said trunk, means for transmitting to said central office information indicating the condition of said subscriber lines, said means comprising a plurality of indicating coils arranged in an array, each of said coils comprising a pair of windings and being associated with one of said telephones, means comprising a voltage source, one of said windings and said telephone instrument for passing current through said one winding to generate a magnetic field of one polarity when said associated telephone is being used but said subscriber line is not connected by said switching means to said trunk, means comprising a voltage source in said central office, said instrument, and the other of said windings for passing current through the other of said windings to generate a magnetic field of opposite polarity when said associated telephone is being used and said subscriber line is connected by said switching means to said trunk, said voltage source in said central office being larger than said first-mentioned voltage source, means comprising unidirectional current means for preventing passage of current through said first winding when current is passing through said second winding, a scanning coil, means for sweeping said scanning coil past said array of indicating coils to generate a pulse in said scanning coil if a field is present at one of said indicating coils, the polarity of said pulse being dependent upon the polarity of said magnetic field, a start coil, means to generate a start pulse in said start coil once every sweep of said scanning coil past said array of indicating coils, and means to transmit said start and indicating pulses to said central office, means in said central office responsive to an indicating pulse to indicate the condition of the subscriber line through the associated coil of which current passed to generate said indicating pulse, and means in said central office actuated by said start pulse to identify the particular subscriber line on which that condition exists.

20. In an electrical system comprising a central station and a plurality of lines remote from said station, means for scanning said lines to generate an indicating pulse of a given polarity on the presence of one condition on one of said lines and to generate an indicating pulse of opposite polarity on the presence of another condition on one of said lines, means for generating a marking pulse once every scanning of said lines, means for transmitting said pulses to said central station, and means within said central station for recognizing and identifying said indicating pulses, said last-mentioned means comprising means including a counter for identifying said one line, an oscillator for driving said counter, means for turning on said oscillator on transmission of a marking pulse to said central station, means for recognizing the coincidence of an indicating pulse and a pulse from said oscillator, and means activated by said last-mentioned means for indicating the condition of said one line.

21. In an electrical system comprising a central station and a plurality of lines remote from said station, means for scanning said lines in succession to generate an indicating pulse on the presence of a certain condition on one of said lines, means for generating a marking pulse once every scanning of said lines, means for transmitting said pulses to said central office, a counter in said central office, an oscillator for driving said counter at a counting rate equal to the time between scanning of successive lines, means starting said oscillator on the reception of a mark pulse at said central office, means responsive to the coincidence of an indicating pulse and the output of said counter for identifying said one line, and means responsive to said pulse for identifying the condition present on said one line.

22. In an electrical system comprising a central station and a plurality of lines remote from said station, means for scanning said lines to generate an indicating pulse of one polarity on the presence of one condition on one of said lines and an indicating pulse of opposite polarity on the presence of a second condition on said one line, means for generating a marking pulse once every scanning of said lines, means for transmitting said pulses to said central station, and means within said central station for recognizing and identifying said indicating pulses, said last-mentioned means comprising an oscillator for driving said counter, means for starting said oscillator on the reception of a marking pulse from said generating means, means for stopping said oscillator on the coincidence of a pulse of one polarity and a pulse from said oscillator at said stopping means, means for indicating the number of pulses counted by said counter when said oscillator is stopped, means for setting up in said counter an identification of said one line, and means for indicating the coincidence of an indicating pulse of the other polarity and a pulse from said counter when said counter has counted up to the identification set up therein.

23. In a telephone system a plurality of telephone instruments, a satellite office, a subscriber line connecting each of said instruments to said satellite office, a central office, at least one talking trunk connecting said satellite office to said central office, switching means for connecting any of said subscriber lines to said trunk, scanning means at said satellite office for scanning said subscriber lines in succession and for transmitting to said central office a pulse indicating a condition on one of said lines.

means for sending a start pulse to said central office once for each scanning of said subscriber lines, and means at said central office for determining the identity of said subscriber line for which said condition exists, said last-mentioned means comprising an oscillator, means starting said oscillator on the arrival of a start pulse from said satellite station, a counter driven by said oscillator at a counting rate equal to the time between scanning of successive lines, means stopping said oscillator on the arrival of an indicating pulse from said satellite office, and means reading the number of pulses counted by said counter when said oscillator is stopped.

24. In a telephone system in accordance with claim 21 means for preventing the starting of said oscillator on the arrival of a start pulse from said satellite station unless said counter is in its idle condition.

25. In a telephone system a plurality of telephone instruments, a satellite office, a subscriber line connecting each of said instruments to said satellite office, a central office, at least one talking trunk connecting said offices, switching means for connecting any of said subscriber lines to said trunk, scanning means at said satellite office for scanning said subscriber lines in succession and for transmitting to said central office a pulse indicating a condition on one of said lines, means for sending a start pulse to said central office once for each scanning of said subscriber lines, and means at said central office for determining whether said condition exists on a particular subscriber line, said last-mentioned means comprising an oscillator, means for starting said oscillator on the reception of a start pulse at said central office, a counter driven by said oscillator at a counting rate equal to the time between scanning of successive lines, means for setting up in said counter an identification of said particular subscriber line, and means responsive to the coincidence of a pulse from said counter when said counter has counted up to the identification set up therein and an indicating pulse for identifying the existence of said condition on said particular line.

26. In a telephone system a plurality of subscriber telephones, a satellite office, a subscriber line connecting each of said telephones to said satellite office, a central office remote from said satellite office, at least one trunk connecting said offices, switching means for connecting any of said subscriber lines to said trunk, a plurality of indicating coils mounted in an array in said satellite office, one of said coils being associated with each of said telephones, means for passing current through one of said coils to generate a magnetic field of one polarity when an associated telephone is being used but the subscriber line thereof is not connected by said switching means to said trunk, means for passing current through one of said coils to generate a magnetic field of the opposite polarity when an associated telephone is being used and the subscriber line thereof is connected by said switching means to said trunk, a scanning coil, means for sweeping said scanning coil past said array of indicating coils to generate an indicating pulse in said scanning coil if a field is present at one of said indicating coils, the polarity of said pulse being dependent on the polarity of said field, a start coil, means to generate a start pulse in said start coil once every sweep of said scanning coil past said array of indicating coils, means to transmit said start and indicating pulses to said central office, an oscillator in said central office, means starting said oscillator on the arrival of a start pulse from said satellite station, a counter driven by said oscillator, means stopping said oscillator on the arrival of an indicating pulse of one polarity from said satellite office, means registering the number of pulses counted by said counter when said oscillator is stopped to identify said line to which said indicating pulse of one polarity pertains, means for setting up in said counter an identification of a particular subscriber line, and means responsive to the coincidence of a pulse from said counter when said counter has counted up to the identification set up therein and an indicating pulse of the opposite polarity for identifying the condition existing on said particular subscriber line.

References Cited in the file of this patent

UNITED STATES PATENTS

| | | |
|---|---|---|
| 1,813,913 | Clokey et al. | July 14, 1931 |
| 2,555,245 | Powell | May 29, 1951 |
| 2,594,923 | Hersey et al. | Apr. 29, 1952 |